(12) United States Patent
Takahashi et al.

(10) Patent No.: US 7,848,071 B2
(45) Date of Patent: Dec. 7, 2010

(54) POWER SUPPLY CONTROLLER

(75) Inventors: Seiji Takahashi, Yokkaichi (JP); Masayuki Kato, Yokkaichi (JP)

(73) Assignees: Autonetworks Technologies, Ltd., Mie (JP); Sumitomo Wiring Systems, Ltd., Mie (JP); Sumitomo Electric Systems, Ltd., Osaka (JP)

( * ) Notice: Subject to any disclaimer, the term of this patent is extended or adjusted under 35 U.S.C. 154(b) by 1019 days.

(21) Appl. No.: 11/643,969

(22) Filed: Dec. 22, 2006

(65) Prior Publication Data

US 2007/0146951 A1   Jun. 28, 2007

(30) Foreign Application Priority Data

Dec. 26, 2005   (JP) .............................. 2005-372018

(51) Int. Cl.
*H02H 3/30* (2006.01)
(52) U.S. Cl. ...................... 361/93.1; 361/18; 361/88; 361/103
(58) Field of Classification Search ............ 361/18, 361/88, 93.1, 103
See application file for complete search history.

(56) References Cited

U.S. PATENT DOCUMENTS

| 7,046,073 | B2 | 5/2006 | Mayama et al. | |
|---|---|---|---|---|
| 2002/0012216 | A1* | 1/2002 | Ohshima | 361/93.1 |
| 2004/0228058 | A1 | 11/2004 | Mayama et al. | |

FOREIGN PATENT DOCUMENTS

| DE | 10 2004 007 181 A1 | 5/2006 |
|---|---|---|
| JP | 2001-217696 | 8/2001 |
| JP | A-2004-248093 | 9/2004 |

OTHER PUBLICATIONS

German Office Action issued in German Patent Application No. 10 2006 061 183.7 on Nov. 20, 2009 (with translation).

* cited by examiner

*Primary Examiner*—Jared J Fureman
*Assistant Examiner*—Nicholas Ieva
(74) *Attorney, Agent, or Firm*—Oliff & Berridge, PLC

(57) ABSTRACT

A power supply controller can include a switching element electrically connected between a power source and a load, an anomaly detecting circuit capable of outputting an abnormal signal, a power supply circuit which generates a constant voltage, a holding circuit which is activated by being supplied with the constant voltage generated by the power supply circuit, continuously outputs a shutoff signal to cause the switching element to perform a shutoff operation on the basis of the abnormal signal, an output circuit, such that if a first off signal is being inputted from an external source, the first off signal continues for a predetermined period of time after the start of the continuous output of the shutoff signal, outputs a second off signal, and an electrical conduction circuit structured to enable the power supply circuit into conduction in response to an on signal from an external source and enable the power supply circuit out of conduction if the second off signal is outputted.

15 Claims, 12 Drawing Sheets

FIG.7

| Counter value | bit0 | bit1 | bit2 | bit3 | bit4 | bit5 |
|---|---|---|---|---|---|---|
| $0 \leq m < 8$ | Lo | Hi | Hi | Hi | Hi | Hi |
| $8 \leq m < 16$ | Hi | Lo | Hi | Hi | Hi | Hi |
| $16 \leq m < 32$ | Hi | Hi | Lo | Hi | Hi | Hi |
| $32 \leq m < 64$ | Hi | Hi | Hi | Lo | Hi | Hi |
| $64 \leq m < 128$ | Hi | Hi | Hi | Hi | Lo | Hi |
| $128 \leq m$ | Hi | Hi | Hi | Hi | Hi | Lo |

POWER SUPPLY CONTROLLER

CROSS REFERENCE TO RELATED APPLICATION

This application claims priority from Japanese Patent Application No. 2005-372018 filed Dec. 26, 2005. The entire content of this priority application is incorporated herein by reference.

TECHNICAL FIELD

The present disclosure relates to a power supply controller.

BACKGROUND

Power supply controllers have been provided in which a semiconductor switching element for high power, for example a power MOSFET, is provided on a conduction channel between a power source and a load, and power supply to the load is controlled by turning on and off the switching element. Such power supply controllers having a self protection function are known. The self protection function controls the electric potential of a control terminal of the switching element and turns off the switching element if an overcurrent flows through the conduction channel, thereby protecting the switching element itself. Specifically, in a self protection function, such as the one described in Japanese Patent Laid-Open No. 2001-217696, a current detecting resistor is connected with a load terminal (for example the source or drain of a MOSFET) in series, a load current flowing through the switching element is detected on the basis of a voltage drop at a resistor and, if the load current exceeds a predetermined threshold, it is determined that an overcurrent has occurred. An electric current shutoff based on the self-protection function is designed in such a manner that the switching element automatically returns to the on state on expiration of a predetermined after shutoff time period. This is because this function is provided in order to avoid overheat of the switching element itself, and as such, a heat sink provided for that purpose quickly decrease the temperature of the switching element after the abnormal current is shut off.

SUMMARY

If an overcurrent problem persists for a long time and the switching element is repeatedly turned on and off more than a certain number of times due to the self-protection function, the switching element can be broken. To prevent such breakage, the switching element should be kept in the off state if an abnormal current persists for a long time. If a control circuit which performs such an operation is to be provided in a power supply controller, it is desirable that a power supply circuit be provided to generate and supply a constant voltage to cause the control circuit to operate stably.

If the power supply circuit is maintained in conduction on a steady basis, leakage current from an external power source such as a battery may flow. To prevent this, it is desirable that the power supply circuit be brought out of conduction when an off signal, for turning off the switching element, is inputted from an external source.

However, if the off signal is inputted from the external source after the switching element enters the shutoff hold state, the arrangement described above brings the power supply circuit out of conduction and consequently the operation of the control circuit is stopped at this time point, bringing the switching element out of the shut off hold state. Therefore, a problem with this arrangement is that if an on signal is inputted shortly after that, the switching element returns to the conduction state even though the abnormal condition (in which the switching element should be kept in the off state) remains.

Some power supply controllers control a switching element to turn on and off in accordance with an on-off signal (for example a PWM signal), which consists of an alternating on and off signals inputted from an external source. A problem with this arrangement is that because a power supply circuit is brought out of conduction each time the off signal is inputted and therefore the switching element cannot be kept in the shutoff hold state.

The present invention has been made under these circumstances and an object of the present invention is to prevent a switching element from being brought out of the shutoff hold state when an off signal is inputted while inhibiting leakage current.

A power supply controller according to the present invention includes a switching element provided in a conduction channel from a power supply to a load, an anomaly detecting circuit which outputs an abnormal signal, a power supply circuit which generates a constant voltage, a holding circuit which is activated by being supplied with the constant voltage generated by the power supply circuit, outputs a shutoff signal to cause the switching element to perform a shutoff operation on the basis of the abnormal signal, and holds the output state of the abnormal signal. The present invention can further include an output circuit which, if a state in which a first off signal is being inputted from an external source continues for a reference waiting time period after the output state is held, outputs a second off signal, and an electrical conduction circuit which brings the power supply circuit into conduction in response to an on signal from an external source and brings the power supply circuit out of conduction if the second off signal is outputted.

With this configuration, the power supply circuits is brought out of conduction if a first off signal (for example a signal for instructing to bring a power supply circuit out of conduction) is being received from an external source for a reference waiting time period after a time during which a shutoff signal is kept outputted. Thus, the power supply circuit is not brought out of conduction at the time when an off signal is received after the output state is held but instead the power supply circuit is kept in conduction and the switching element can be held in the shutoff state unless the off signal input state continues for the reference waiting time. On the other hand, if the off signal input state continues for the reference waiting time, the power supply circuit is brought out of conduction and therefore a leakage current can be prevented.

The power supply controller according to the present invention described above preferably includes a normal time accumulating circuit which outputs a clear signal if-a normal state in which the abnormal signal is not outputted continues for a reference normal time period before the output state is held, wherein the electrical conduction circuit brings the power supply circuit out of conduction if the first off signal is inputted and the clear signal is outputted before the output state is held. The holding circuit preferably includes an anomaly time accumulating circuit which accumulates the amount of anomaly time during which the abnormal signal is being outputted and, if the accumulated amount of time exceeds a reference anomaly time, outputs the shutoff signal and holds the output state the abnormal signal.

With this configuration, the power supply circuit is held in conduction when it receives an on signal within the reference normal time period after it has received an off signal during the accumulation operation by the anomaly time accumulating circuit. Thus, the amount of time accumulated by the anomaly time accumulating circuit can be prevented from being reset.

The anomaly time accumulating circuit in the configuration described above preferably clears the accumulated amount of anomaly time if the clear signal is outputted from the normal time accumulating circuit before the output state is held. With this configuration, accumulation of the amount of anomaly time is started when a load current flowing through a conduction channel (or the temperature of the conduction channel) exceeds a predetermined threshold, for example. When the amount of anomaly time reaches the reference anomaly time, the switching element is shut off. On the other hand, at least if the normal state in which an abnormal signal is outputted continues for the reference normal time, the amount of time accumulated by the anomaly time accumulating circuit up to that time is cleared (the current accumulated amount of time is reset to its initial value or set to a value closer to the initial value than the current accumulated amount of time) to prevent a semiconductor switch from being shut off. Thus, not only a continuous abnormal current but also a brief chattering short (which is an abnormal current intermittently occurring at intervals shorter than the normal reference time periods) can be detected to protect an external circuit (load and/or wire). According to this configuration, a clear signal from the normal time accumulating circuit used for the function of protecting such an external circuit (fuse function) can be used to control the conduction of a power supply circuit.

The reference normal time in the present invention is preferably set to a longer time than the shutoff time during which the switching element remains shut off after each input of the off signal of the on-off signal. With this configuration, a switching element in a circuit in which the switching element is turned on and off in accordance with an on-off signal (for example a PWM signal) which is inputted from an external source and alternates between on and off signals can be prevented from being brought out of a shutoff hold state in response to input of the off signal.

BRIEF DESCRIPTION OF THE DRAWINGS

Illustrative aspects in accordance with the invention will be described in detail with reference to the following figures wherein:

FIG. 7 is a table showing association between counter values of a fuse time counter and bit signals;

DETAILED DESCRIPTION OF THE PRESENT INVENTION

One embodiment according to the present invention will be described with reference to FIGS. 1 to 12.

Configuration of Power Supply Controller

Figure 1:
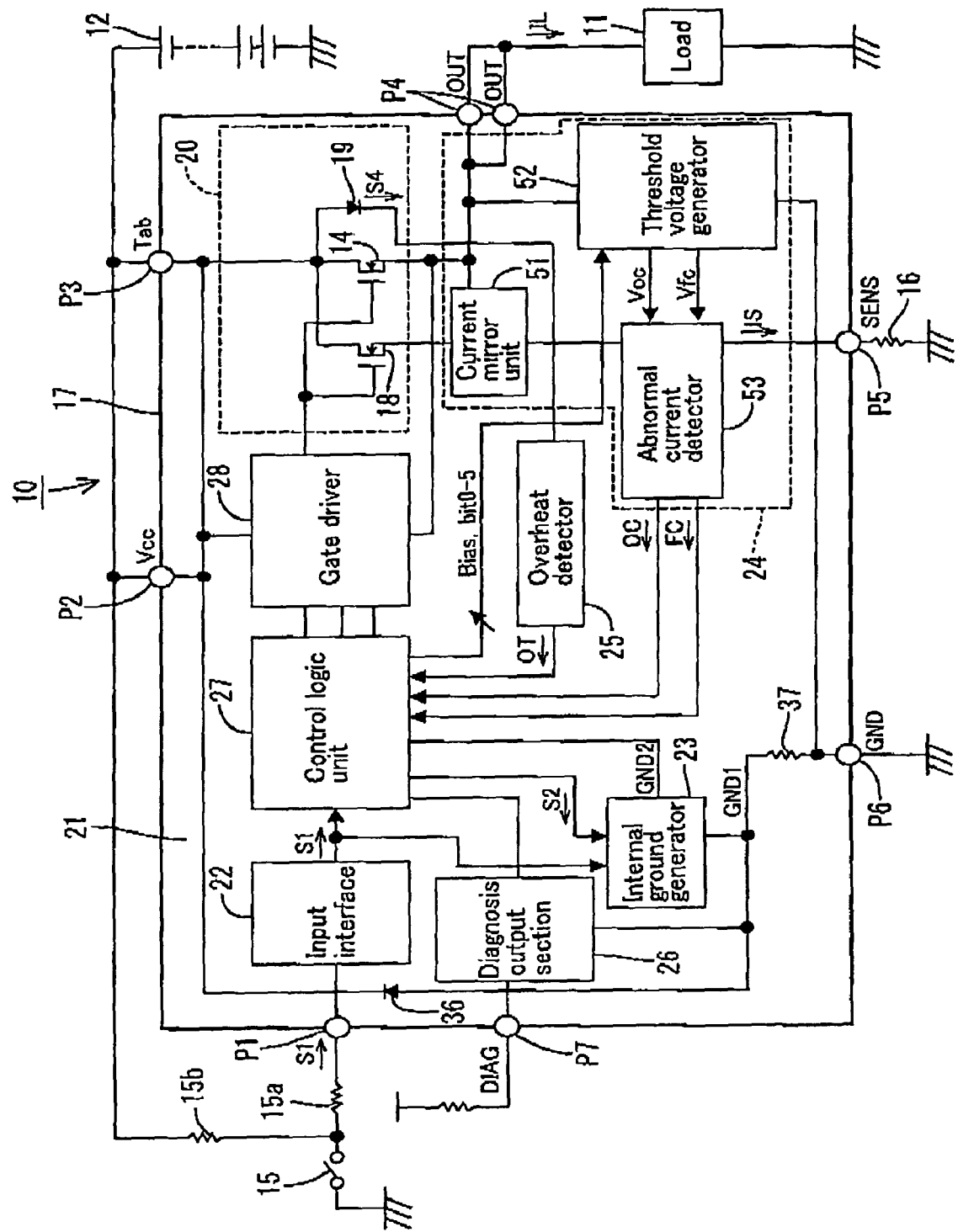
FIG. 1 is a block diagram showing an overall configuration of a power supply controller according to one illustrative aspect of the invention.

FIG. 1 is a block diagram showing an overall configuration of a power supply controller 10 according to one embodiment of the present invention. The power supply controller 10 is provided in a vehicle, not shown, and controls power supply from an on-vehicle power source (hereinafter referred to as the "power source 12") to a load 11. The load 11 may be a vehicle lamp, a cooling fan motor, a defogger heater, or the like. The term "load" as used in the following description means a device under the control of the power supply controller 10, excluding a wire 30 between the power supply controller 10 and the device under control. The term "external circuit" as used herein means a circuit including the load 11 and the wire 30.

Specifically, the power supply controller 10 includes a power MOSFET 14 (an example of a "switching element" and "power FET") provided in a conduction channel 13 from a power supply 12 to a load 11. The power supply controller 10 provides a control signal S1 such as a constant voltage signal or a PWM (Pulse Width Modulation) control signal to the gate of the power MOSFET 14 to turn on and off the MOSFET 14, thereby controlling power supply to the load 11, which is led to the output of the power MOSFET 14. In this embodiment, the power supply controller 10 has an input terminal P1, which is connected to an external operation switch 15. When the switch 15 is turned on, the power supply controller 10 is activated. In particular, the input terminal P1 is connected to the operation switch 15 through a resistor 15a, and a connection point between the resistor 15a and the operation switch 15 is connected to the power source 12 through a resistor 15b. The input terminal P1 is pulled up to a power supply voltage Vcc when the operation switch 15 is in the off state.

As shown in FIG. 1, the power supply controller 10 is implemented as a semiconductor switching device 17 (semiconductor device) that includes the input terminal P1, a power supply (Vcc) terminal P2 and a tab terminal P3 connected to the power source 12, a load connection terminal P4 connected to the load 11, an external terminal P5 connected to a ground (GND) through an external resistor 16 which is a current-voltage converter circuit, a ground terminal P6 directly connected to the ground (GND), and a diagnosis output terminal P7. In this illustrative aspect, the power MOSFET 14, a sense MOSFET 18 (an example of a "current detecting element" and "sense FET"), which will be described later, and a temperature sensor 19 (for example a diode) which is a temperature detecting element are integrated into one chip, a power chip 20, which is then integrated into a control chip 21.

In the power chip 20, multiple MOSFETs whose drains are connected in common to the tab terminal P3 are arranged, most of which constitute a power MOSFET 14 whose sources are connected in common to a power FET input 51a of a current mirror unit 51, which will be described later, and the load connection terminal P4, and the rest of the MOSFETs constitute a sense MOSFET 18 whose sources are connected in common to a sense FET input 51b of the current mirror unit 51. The ratio of the number of MOSFETs constituting the power MOSFET 14 to the number of the MOSFETs constituting the sense MOSFET 18 is approximately equal to the sense ratio.

Provided on the control chip 21 are an input interface 22, an internal ground generator 23, a current detector 24, an overheat detector 25, a diagnosis output section 26, a control logic unit 27 which functions as an overcurrent protection circuit and overheat protection circuit, and a gate driver 28.

Input Interface

The input of the input interface 22 is connected to the input terminal P1. When the operation switch 15 is turned off, a high-level control signal S1 is inputted; when the operation switch 15 is turned on, a low-level control signal S1 is inputted. The control signal S1 is provided to the internal ground generator 23 and the control logic unit 27. As will be described later, the power supply controller 10 controls the gate driver 28 to turn on the power MOSFET 14 in response to the low-level control signal S1 in a normal state in which neither an abnormal current nor an abnormal temperature is generated. On the other hand, in response to the high-level control signal S1, the power supply controller 10 controls the gate driver 28 to turn off the power MOSFET 14 to place it in the shutoff state. Accordingly, the low-level control signal S1 is an example of an "on signal", the high-level control signal S1 is an example of a "(first) off signal", and the gate driver 28 functions as a "control circuit".

Figure 2:
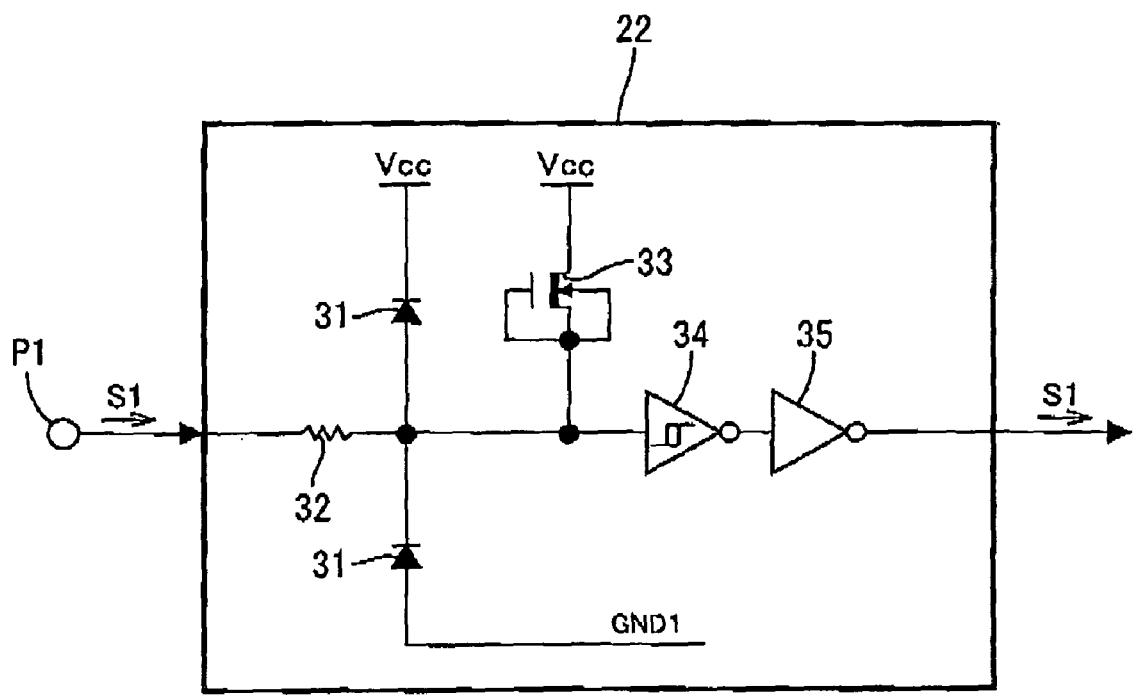
FIG. 2 is a schematic circuit diagram of an input interface.

In particular, in the input interface 22, a pair of diodes 31 whose cathodes are positioned on the high-potential side are connected in series between the power supply terminal P2 and the internal ground GND1 (0<GND1<Vcc) and the input terminal P1 is connected to the connection point between them through a resistor 32 as shown in FIG. 2. Connected in parallel to the diode 31 on the high-potential side is a FET 33 whose gate and source are shorted with each other. When the high-level control signal S1 is inputted at the input terminal P1, the input terminal P1 is pulled up to the power supply voltage Vcc and a high-level signal (referred to as the high-level control signal S1 in the present illustrative aspect for simplicity) corresponding to the high-level control signal S1 is outputted through a hysteresis comparator 34 and an inverter circuit 35. On the other hand, when the low-level control signal S1 is inputted at the input terminal P1, a constant current flows from the FET 33 to the input terminal P1 through the resistor 32 and a low-level signal (referred to as the low-level control signal S1 in the illustrative aspect for simplicity) corresponding to the low-level control signal S1 is outputted through the hysteresis comparator 34 and the inverter circuit 35.

If a control signal S1 with a negative voltage (<GND1) is inputted at the input terminal P1, a current flows from the internal ground GND1 to the input terminal P1 through the diode 31 (on the low-potential side) and the resistor 32 and a low-level control signal S1 is outputted. As shown in FIG. 1, a diode 36 whose cathode is positioned on the high-potential side is connected with a resistor 37 in series between the power supply terminal P2 and the ground terminal P6 and the connection point between them is the internal ground GND1. With this configuration, a current flowing through the circuitry of the power supply controller 10 can be controlled by the diode 36 so as not to exceed a predetermined level even if the ground terminal P6 is accidentally connected to the power supply voltage Vcc.

Internal Ground Generator

The internal ground generator 23 (an example of the "power supply circuit") is in conduction and is generating an internal ground GND2 that is lower than the power supply voltage Vcc by a predetermined amount of voltage while the internal ground generator 23 is receiving one of the low-level control signal S1 (on signal) from the input interface 22 and a low-level signal S2 outputted from a clear counter 72 (the state where the clear counter 72 is not overflowing), which will be described later. In other words, the internal ground generator 23 remains in conduction and continue generating the internal ground GND2 as long as it is receiving the low-level output signal S2 from the clear counter 72 even if it receives the high-level control signal S1 (off signal) from the input interface 22. A constant voltage that is the power supply voltage Vcc minus the internal ground GND2 is supplied to the control logic unit 27 to place the control logic unit 27 in a operational state.

Figure 3:
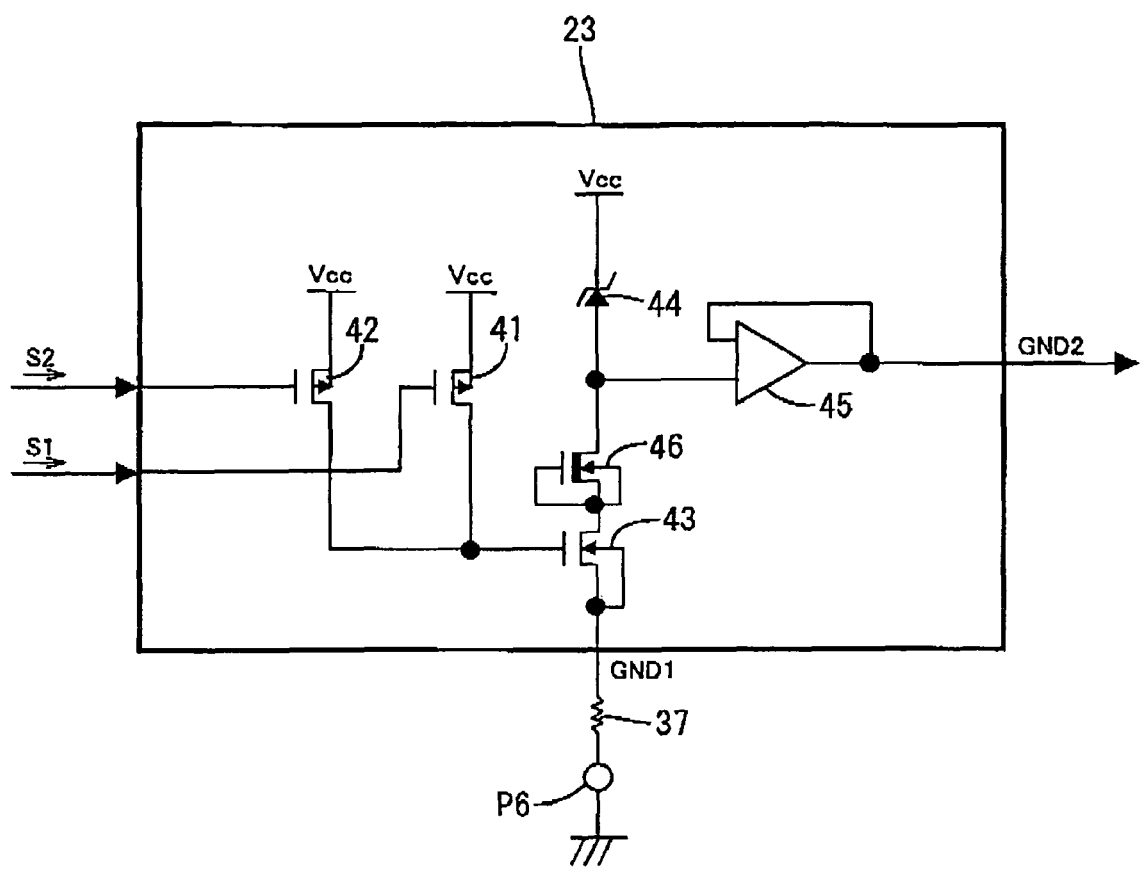
FIG. 3 shows a schematic circuit diagram of an internal ground generator.

In particular, the internal ground generator 23 includes a FET 41, which is an switching element that is turned on in response to the low-level control signal S1 and a FET 42, which is a switching element that is turned on in response to the low-level output signal S2, as shown in FIG. 3. The outputs of these FETs 41, 42 are connected to a control terminal of another FET 43 which is a switching element. The input (drain) of the FET 43 is connected to the power supply terminal P2 through a Zener diode 44 and the output (source) is connected to the ground terminal PG through the resistor 37. Accordingly, the FETs 41 and 42 function as "electrical conduction circuits".

When the low-level control signal S1 or the low-level output signal S2 is inputted in the internal ground generator 23, the FET 43 turns on to bring the internal ground generator 23 in conduction and the internal ground generator 23 generates the internal ground GND2 lower than the power supply voltage Vcc by an amount equal to a Zener voltage of the Zener diode 44, which is provided to the control logic unit 27 through an operational amplifier 45 in voltage follower connection. In this embodiment, a FET 46 whose source and gate are shorted with each other is connected into the conduction channel along which the Zener diode 44 and FET 43 are connected, so that a constant current flows through the Zener diode 44 while the FET 43 is in the on state, thereby further stabilizing the internal ground GND2.

Current Detector

Figure 4:
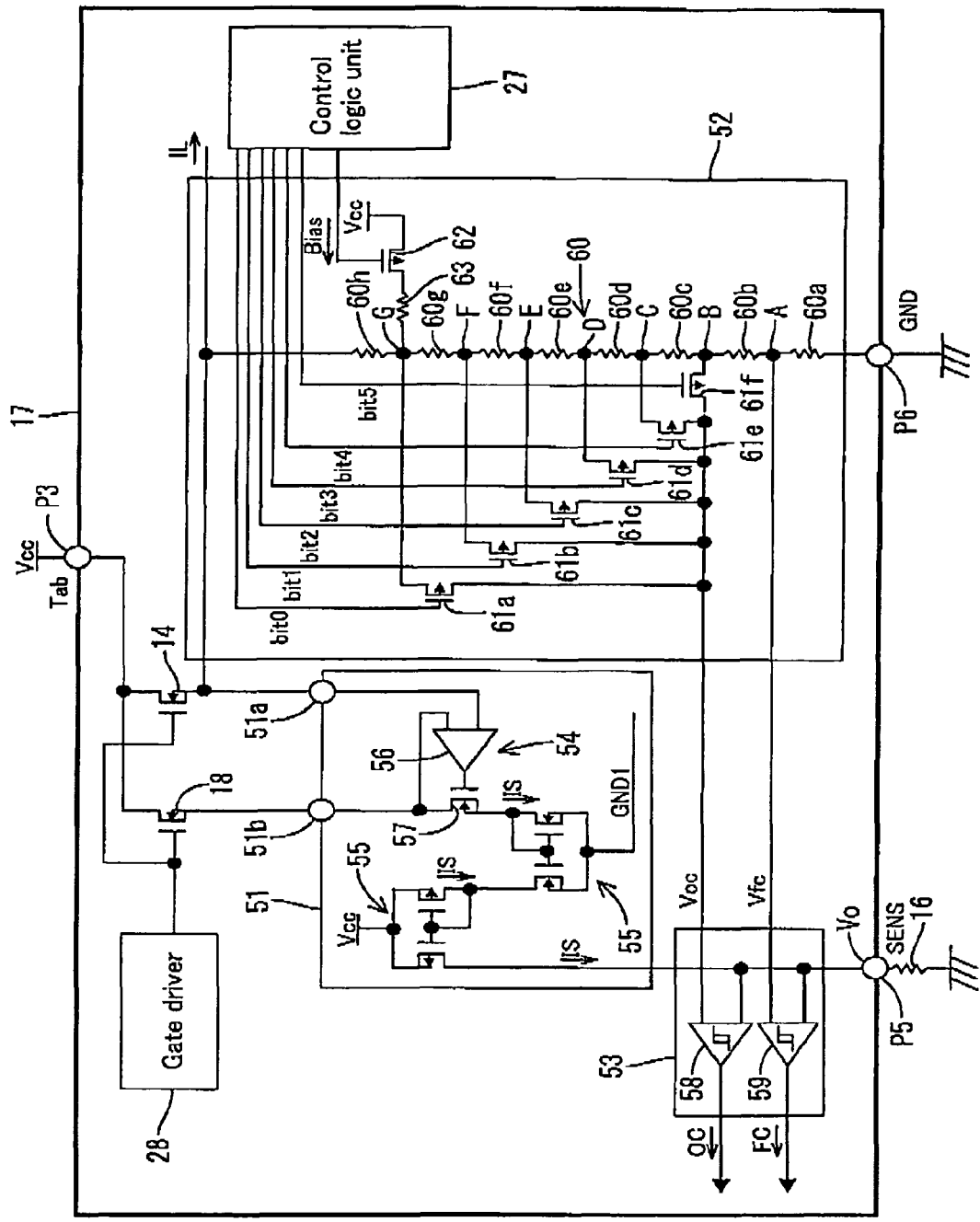
FIG. 4 is a schematic circuit diagram of a current mirror unit, a threshold voltage generator, and an abnormal overcurrent detector.

The current detector 24 includes a current mirror unit 51, a threshold voltage generator 52, and an abnormal overcurrent detector 53 as shown in FIG. 1. FIG. 4 is an enlarged view of the circuitry including the current mirror unit 51, the threshold voltage generator 52, and the abnormal current detector 53. Some of the other circuit components are omitted from FIG. 4.

a. Current Mirror Unit

The current mirror unit 51 includes a potential control circuit 54 for maintaining the output potentials (source potentials) of the power MOSFET 14 and the sense MOSFET 18 at an identical level and a pair of current mirror circuits 55.

The potential control circuit 54 includes an operational amplifier 56 having a pair of input terminals to which the power FET input 51a (the source of the power MOSFET 14) and the sense FET input 51b (the source of the sense MOSFET 18) are connected, and a FET 57 which is a switching element which is connected between the sense FET input 51b and the external terminal P5 and has a control terminal to which an output from the operational amplifier 56 is provided. More specifically, the power FET input 51a is connected to the inverting input of the operational amplifier 56 and the sense FET input 51b is connected to the non-inverting input of the operational amplifier 56. The differential output of the operational amplifier 56 is fed back to the non-inverting input through the gate-drain of the FET 57.

By feeding back the differential output of the operational amplifier 56, an imaginary short state occurs where the potentials of the inverting and non-inverting inputs of the operational amplifier 56 are approximately the same. Consequently, the potential of the drain of the power MOSFET 14 and that of the sense MOSFET 18 become identical and the potentials of their sources also become identical to each other. Therefore, a sense current Is (an example of a "detection signal from the current detecting element") with a stable constant ratio to the load current IL flowing through the power MOSFET 14 (the sense ratio mentioned above) can be passed through the sense MOSFET 18.

The sense current Is from the potential control circuit 54 flows to the external resistor 16 through the pair of current mirror circuits 55 and the external terminal P5. The terminal voltage Vo at the external terminal P5 varies according to the sense current Is.

b. Abnormal Overcurrent Detector

The abnormal current detector 53 (an example of an "anomoly detecting circuit" and "conduction detecting circuit") includes multiple (two in the present illustrative aspect) comparators 58, 59 (hysteresis comparators in the present illustrative aspect). The terminal voltage Vo at the external terminal P5 is provided to one of the input terminals of the comparator 58 and to one of the input terminals of the comparator 59.

The comparator 58 receives at the other input terminal a first anomaly threshold voltage Voc from the threshold voltage generator 52 and, if the terminal voltage Vo exceeds the first anomaly threshold voltage Voc, outputs a low-level first abnormal current signal OC (an example of an "abnormal signal") to the control logic unit 27. Hereinafter a load current IL that flows through the power MOSFET 14 at the time of the abnormal current in which the terminal voltage Vo reaches the first anomaly threshold voltage Voc is referred to as a "first anomaly threshold current ILoc" and the abnormal current can be referred to as an "overcurrent".

The comparator 59 receives at the other input terminal a second anomaly threshold voltage Vfc (<Voc) from the threshold voltage generator 52 and, if the terminal voltage Vo exceeds the second anomaly threshold voltage Vfc, outputs a low-level second abnormal current signal FC (an example of the "abnormal signal" and "conduction detection signal") to the control logic unit 27. Hereinafter, the load current IL that flows through the power MOSFET 14 at the time of the abnormal current in which the terminal voltage Vo reaches the second anomaly threshold voltage Vfc is referred to as a "second anomaly threshold voltage ILfc" and the abnormal current is referred to as a "fuse current".

c. Threshold Voltage Generator

The threshold voltage generator 52 (an example of a "threshold changing circuit") includes a voltage divider circuit which divides a reference voltage by using multiple resistors and is capable of changing the anomaly threshold voltage to be provided to the abnormal overcurrent detector 53 by changing a selected one of the partial voltages generated by the voltage divider circuit. In particular, the threshold voltage generator 52 includes a voltage divider circuit 60 connected between the source of the power MOSFET 14 and the ground terminal P6 as shown in FIG. 4. The voltage divider circuit 60 includes multiple resistors (eight resistors 60a-60h in the present illustrative aspect) connected in series and outputs the partial voltage at the connection point A between the resistors 60a and 60b as the second anomaly threshold voltage Vfc.

The threshold voltage generator 52 also includes multiple FETs 61a-61f functioning as switching elements that enable the other input terminal of the comparator 58 to be selectively connected to one of the connection points B-G of resistors 60b-60h. By selectively turning on FETs 61a to 61f in sequence, the level of the first anomaly threshold voltage Voc can be gradually decreased. Each of FETs 61a-61f is turned on and off by the control logic unit 27 as will be described later.

While the voltage divider circuit 60 according to the present illustrative aspect divides the source voltage Vs of the power MOSFET 14, it may divide a predetermined voltage other than the source voltage. However, the configuration according to the present illustrative aspect can set each anomaly threshold voltage in such a manner that it changes in accordance with variations in the source voltage Vs of the power MOSFET 14. Therefore, as compared with the configuration that sets a fixed threshold regardless of variations in the source voltage, the configuration according to the present illustrative aspect enables an abnormal current to be detected quickly because it a short-circuit of the load 11 occurs, for example, the terminal voltage Vo of the external resistor 16 immediately reaches the anomaly threshold voltage regardless of the level of the power supply voltage Vcc. Furthermore, in the present illustrative aspect, in order to apply a bias to prevent the source voltage Vs from decreasing to 0 V when the power MOSFET 14 is in the off state, a current from the power source 12 is flown through the voltage divider circuit 60 through a resistor 63 by using an FET 62 functioning as a switching element that turns on in response to a bias signal, Bias, from the control logic unit 27. The bias signal, Bias, is outputted from the control logic unit 27 to turn on the FET 62 when a low-level control signal S1 or a low-level output signal S2 is provided.

Figure 5:
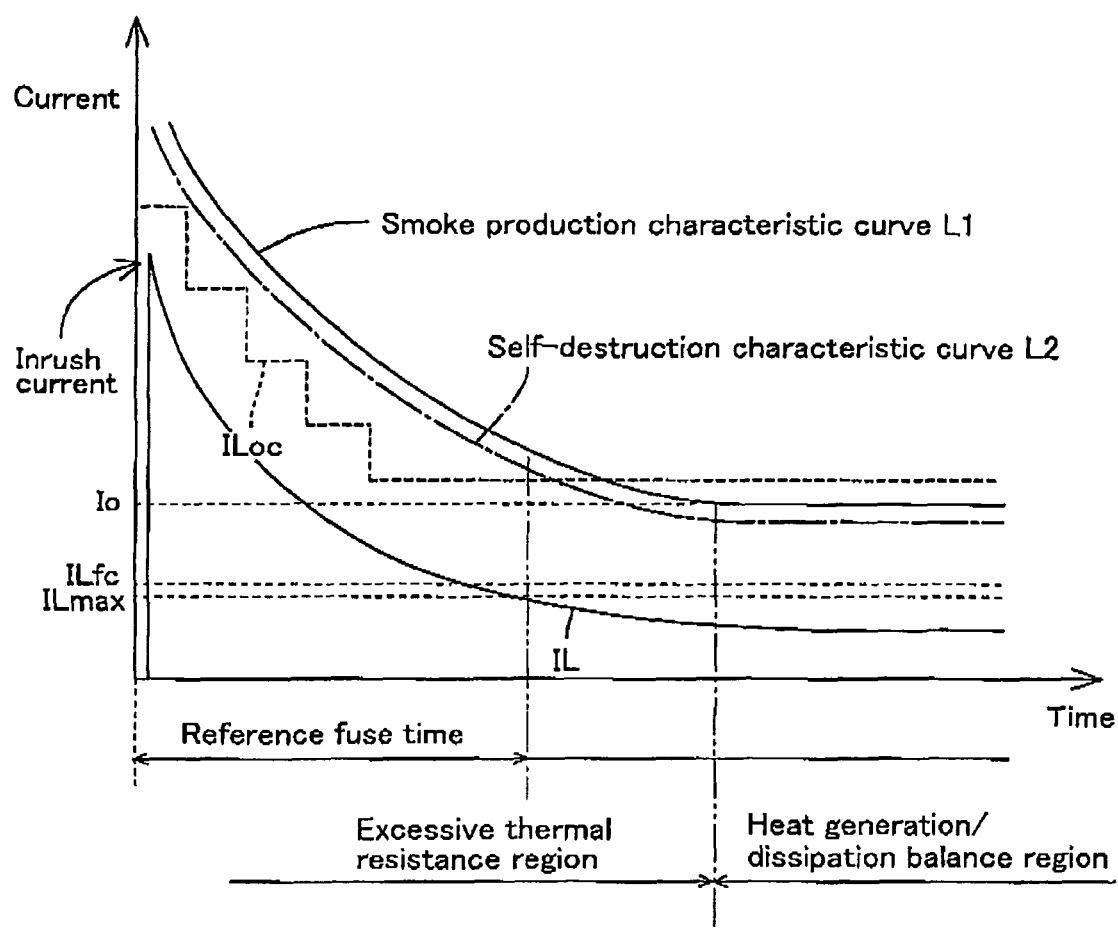
FIG. 5 is a graph for illustrating set levels of first and second anomaly threshold currents.

FIG. 5 is a graph illustrating set levels of the first anomaly threshold current Iloc and second anomaly threshold current ILfc. Shown in this graph is a smoke production characteristic curve L1 representing the smoke production characteristic of a wile 30 (for example a wire coating material) that can be connected to the power supply controller 10 in terms of the relationship between a steady-state current level and energizing time (meltdown time). That is, the smoke production characteristic curve L1 represents the relationship between a given constant current (one-shot current) and the time elapsing from the start of passage of the current through the wire 30 to the occurrence of burnout of the coating material of the wire 30. Also shown in the graph is a self-destruction characteristic curve L2 representing the relationship between a given constant current (one-shot current) and the time elapsing the start of passage of that current through the power MOSFET 14 to the breakage of the power MOSFET 14. The second anomaly threshold current ILfc is set within a region where the current level is below the smoke production characteristic curve L1 and the self-destruction characteristic curve L2. The first anomaly threshold current ILoc is set within a region where the current level is below the smoke production characteristic curve L1 and the self-destruction characteristic curve L2 in a time period shorter than a reference fuse time, which will be described later, that starts when a fuse time counter 73 starts counting up from the initial value.

The graph shows the smoke production characteristics of one wire 30 selected from among wires 30 that can be connected to the power supply controller 10. The smoke production characteristic varies depending on the external circuit (materials for wiring and the load) connected to the power supply controller 10, and, accordingly, including load current IL and sense current Is that flow when the abnormal current signals FC and OC are outputted. However, these variations can be readily accommodated by changing the resistance value of the external resistor 16 mentioned above.

In the graph, ILmax denotes the rated current (the designer's guaranteed allowable maximum current that a device can carry) of the load 11 and Io denotes the maximum allowable current in balance that can be flown through the wire 30 in a state where heat generation and dissipation are in balance. When a current at a level higher than the maximum allowable current in balance Io, an excessive thermal resistance region is entered in which the current level and the time elapsing from the passage of the current to burnout are substantially in inverse proportion. In the second anomaly threshold current ILfc, the load current IL (sense current Is) is set to a level slightly higher than the rated current ILmax of the load 11 as shown in FIG. 5. The comparator 59 detects a fuse current flowing at the time the load current IL (sense current Is) has reached the second anomaly threshold current ILfc and outputs the second abnormal current signal FC. If the load current IL is approximately equal to the second anomaly threshold current ILfc, the power MOSFET 14 does not need to be immediately turned off; it may be turned off after the fuse current state persists for a certain time as will be described later.

On the other hand, the first anomaly threshold current ILoc is set at a level higher than the second anomaly threshold current ILfc. The comparator 58 detects an overcurrent flowing at the time the load current IL (sense current Is) has reached the first anomaly threshold current ILoc and outputs the first abnormal current signal OC. When the load current IL exceeds the first anomaly threshold current ILoc, the power MOSFET 14 must be immediately turned off, as will be described later. The threshold voltage generator 52 initially sets, in preparation for an inrush current, the first anomaly threshold current ILoc to an initial level higher than the inrush current and, when a fuse current is detected, gradually reduces the level with time as shown in FIG. 5.

Overheat Detector

The overheat detector 25 (an example of an "anomaly detecting circuit") receives a temperature signal S4 (an example of a "detection signal from the temperature detecting element") corresponding to the temperature of the power chip 20 from a temperature sensor 19 provided on the power chip 20. When the overheat detector 25 receives a temperature signal S4 indicating an abnormal temperature that exceeds a predetermined temperature threshold, the overheat detector 25 detects the temperature anomaly and provides a low-level, abnormal temperature signal OT (an example of the "abnormal signal") to the control logic unit 27.

The diagnosis output section 26 pulls down the diagnosis output terminal P7 to a low level and provides a diagnosis output in response to a high-level, diagnosis signal (DIAG.) from the control logic unit 27 when an abnormal current or temperature occurs (as will be described later) and the control logic unit 27 causes the power MOSFET 14 to perform first and second forced shutoff operations, which will be described later. Thus, the fact that the power MOSFET 14 is in the forced shutoff state due to the occurrence of abnormal current or temperature or activation of fuse function can be notified to the outside.

Control Logic Unit

Figure 6:
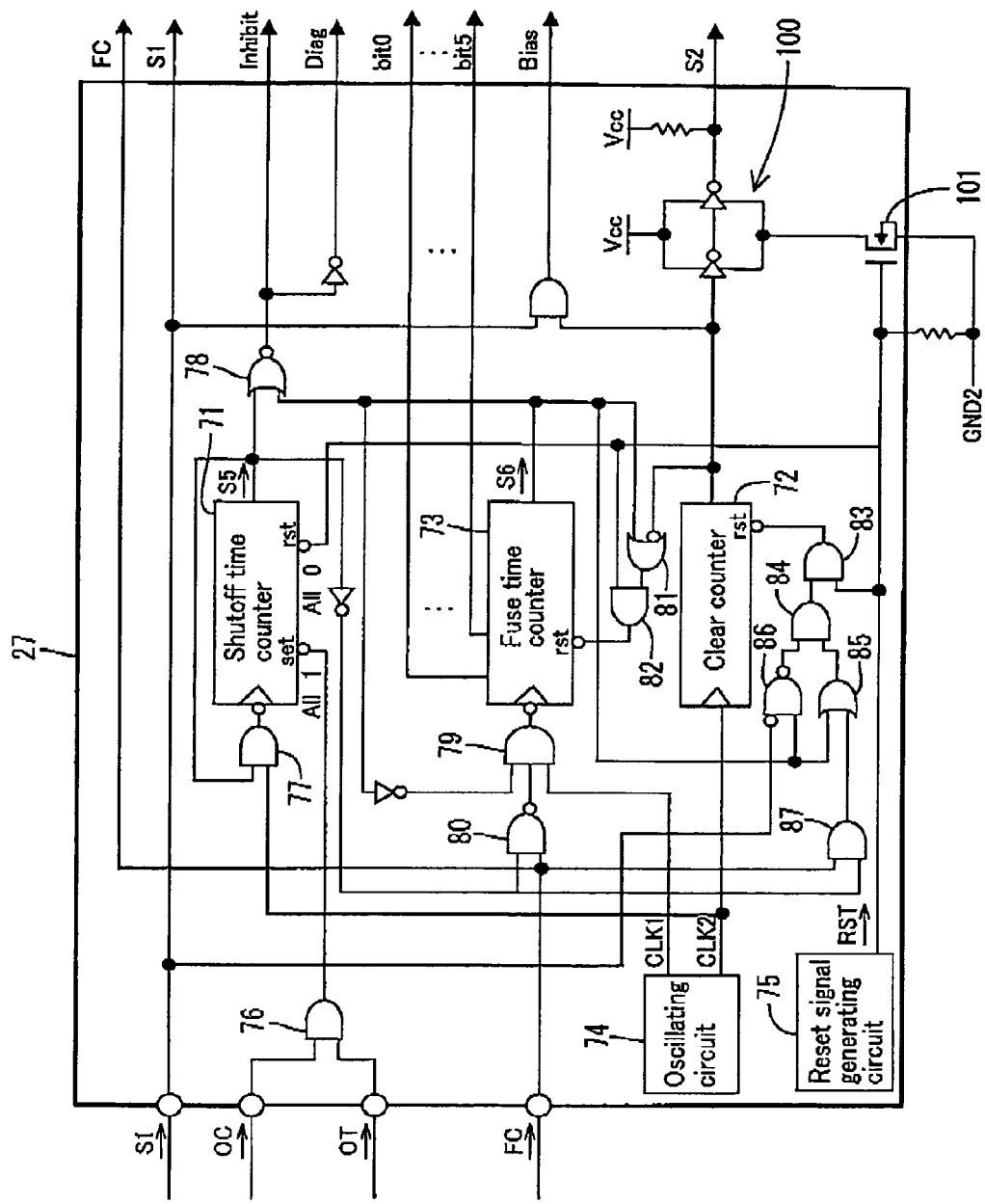
FIG. 6 is a schematic circuit diagram of a control logic unit.

FIG. 6 is a schematic circuit diagram of the control logic unit 27. The control logic unit 27 includes a shutoff time counter 71, a clear counter 72, a fuse time counter 73, an oscillating circuit 74, and a reset signal generating circuit 75. The control logic unit 27 receives the control signal S1 from the input interface 22, the first abnormal current signal OC and second abnormal current signal FC from the current detector 24, and the abnormal temperature signal OT from the overheat detector 25.

a. Oscillating Circuit and Reset Signal Generating Circuit

The oscillating circuit 74 generates and outputs two clock signals CLK1 (125 μsec for example) and CLK2 (4 msec for example) having different cycles. The reset signal generating circuit 75 generates a constant voltage sufficiently high to bring the internal ground generator 23 into conduction and to cause the control logic unit 27 to operate, and continues outputting a low-level output signal RST (reset signal) until the clock generation by the oscillating circuit 74 becomes stable, and then outputs a high-level output signal RST.

b. Shutoff Time Counter

In response to at least one of the low-level first abnormal current signal OC from the current detector 24 and the low-level abnormal temperature signal OT from the overheat detector 25, the shutoff time counter 71 forces the power MOSFET 14 to shut off and be kept in the shutoff state for a predetermined reference shutoff time period (time required for counting down from "n" to "0", specifically 32 msec), and then releases the power MOSFET 14 from the forced shutoff state. It should be noted that the forced shutoff in the present illustrative aspect is to bring the power MOSFET 14 into and keep in the shutoff state even if the power supply controller 10 has received a low-level control signal S1 (on signal).

In particular, the shutoff time counter 71 counts down from the initial value n to 0 in synchronization with the clock signal CLK2. The shutoff time counter 71 is designed to receive, at its reset terminal, the inverted signal of an output signal RST from the reset signal generating circuit 75. All of the n counters are kept reset to "0" (count value is reset to the initial value "n") while a low-level output signal RST is being outputted. The counters are released from the reset state in response to a high-level output signal RST. The shutoff time counter 71 outputs a low-level output signal S5 when all of the n counters are "0" (the reset state or a count value overflow state); otherwise, the shutoff time counter 71 outputs a high-level output signal S5 to force the power MOSFET 14 to shut off.

The shutoff time counter 71 also receives, at its set terminal, the first abnormal current signal OC and the inverted signal of an output signal from an AND circuit 76 to which abnormal temperature signal OT is inputted. If an overcurrent occurs and a low-level first abnormal current signal OC is provided to the shutoff time counter 71, or if abnormal temperature occurs and a low-level abnormal temperature signal OT is provided to the shutoff time counter 71, the shutoff time counter 71 sets all of the n counters to "1". Consequently, the shutoff time counter 71 outputs a high-level output signal S5 to enable the clock signal CLK 2 from the oscillating circuit 74 at the AND circuit 77, and starts countdown at timing in synchronization with the clock. The shutoff time counter 71 performs the counting at the trailing edge of each clock.

Since the high-level output signal S5 is being outputted during the time period from the start of the countdown by the shutoff time counter 71 until the shutoff time counter 71 counts down to "0" to overflow, the clock signal CLK2 is enabled at the AND circuit 77 and is inputted to the clock terminal of the shutoff time counter 71. An OR circuit 78 receives the high-level output signal S5 and provides a low-level output signal, Inhibit, to the gate driver 28 to force the power MOSFET 14 to shut off.

After counting down to "0" and over flowing, the shutoff time counter 71 outputs a low-level output signal S5 and the input of clock signal CLK2 is disabled at the AND circuit 77. The OR circuit 78 receives the low-level output signal S5 and provides a high-level output signal Inhibit to the gate driver 28 to release the power MOSFET 14 from the forced shutoff state. Consequently, the power MOSFET 14 returns to the conduction state if the power supply controller 10 receives a low-level control signal S1 (on signal).

Figure 11:
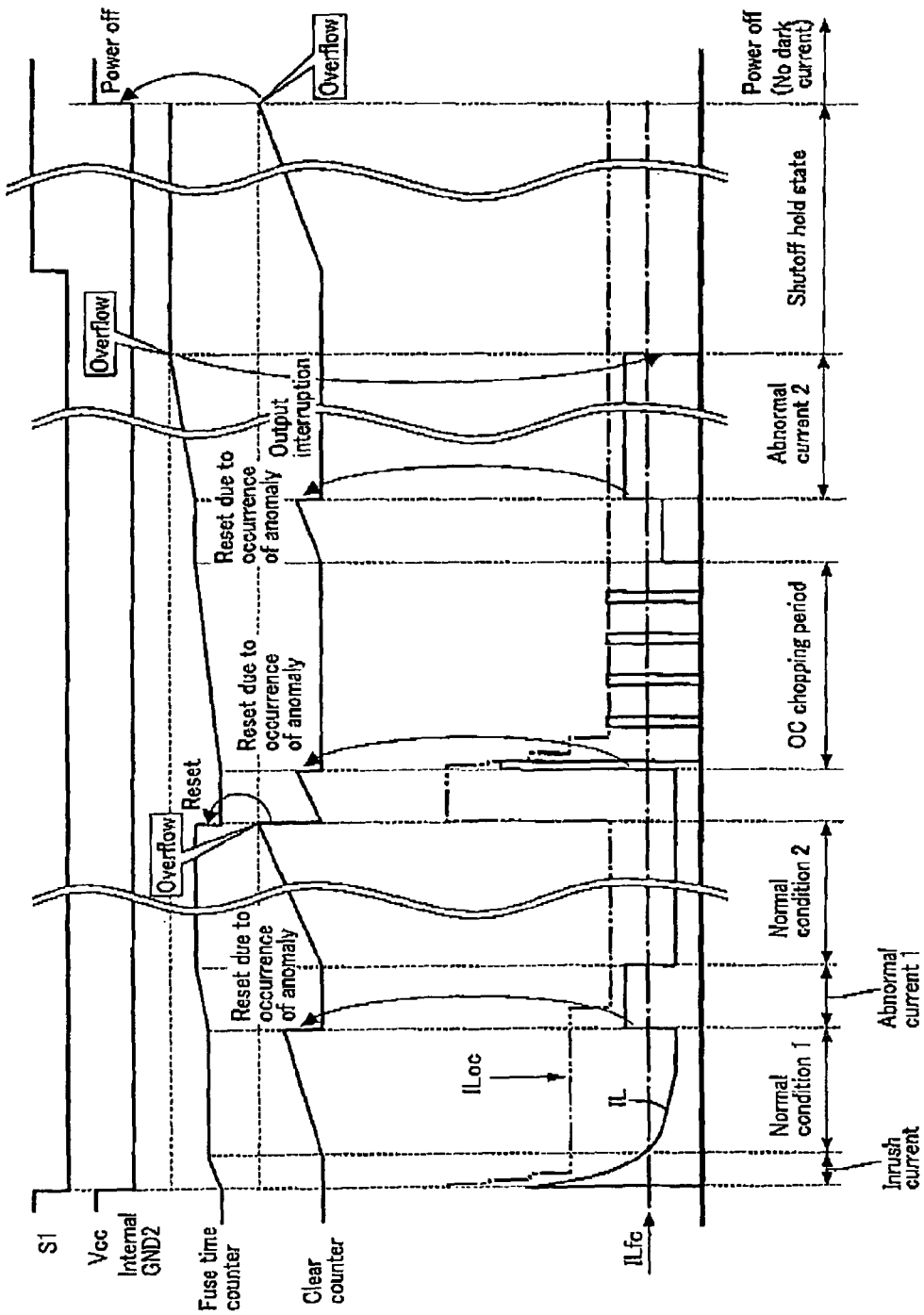
FIG. 11 is a timing chart of a control signal which is a low-level constant voltage signal received by a power supply controller.

In this way, each time an overcurrent, for example, occurs and the low-level first abnormal current signal OC is outputted from the current detector 24, the shutoff time counter 71 immediately forces the power MOSFET 14 to shutoff and, after the countdown of n, releases the power MOSFET 14 from the forced shutoff state, as shown in FIG. 11 (see the OC chopping period). Hereinafter, the forced shutoff caused by the shutoff time counter 71 in which the MOSFET 14 is held in a shutoff state for a predetermined reference shutoff time period and then returns to the conduction state is called the "first forced shutoff".

c. Fuse Time Counter

The fuse time counter 73 (an example of an "anomaly time accumulating circuit") accumulates the amount of anomaly time (hereinafter referred to as "fuse time") during which it is receiving a low-level second abnormal current signal FC from the current detector 24 and the amount of anomaly time during which the power MOSFET 14 is kept in the forced shutoff state by the shutoff time counter 71. When the accumulated amount of time reaches a predetermined reference fuse time (which is shorter than the reference shutoff time and is the time required for counting up from "0" to m (>n), specifically 1,024 msec, and is an example of "reference anomaly time"), the fuse time counter 73 forces the power MOSFET 14 to shutoff.

In particular, the fuse time counter 73 counts up from the initial value, 0, to m in synchronization with the clock signal CLK1. The fuse time counter 73 performs the count-up at the trailing edge of each clock. More specifically, the fuse time counter 73 outputs a low-level output signal S6 during the count-up. After counting up to "m" and overflowing, the fuse time counter 73 outputs a high-level output signal S6 (an example of a "shutoff signal"). The inverted signal of the output signal S6 from the fuse time counter 73 and an output signal from a NAND circuit 80 are inputted into an AND circuit 79 for enabling the clock signal CLK1 from the oscillating circuit 74. The NAND circuit 80 outputs a high-level signal on receiving a low-level second abnormal current signal FC or on receiving a low-level signal that is the inverted signal of a high-level output signal S5 while the shutoff time counter 71 is counting down.

Thus, the fuse time counter 73 performs count-up operation when a low-level second abnormal current signal FC is outputted or the clock signal CLK1 is enabled at the AND circuit 79 while the shutoff time counter 71 is counting down, until overflow occurs. After it counts up to "m" and overflows, the fuse time counter 73 outputs a high-level output signal S6. The OR circuit 78 receives the high-level output signal S6 and outputs a low-level output signal, Inhibit, to the gate driver 28 to force the power MOSFET 14 to shutoff. Hereinafter the forced shutoff caused by the overflow of the fuse time counter 73 is called the "second forced shutoff". Since the high-level output signal S6 is outputted, input of the clock signal CLK1 into the fuse time counter 73 is disabled and therefore the fuse time counter 73 is kept in the overflow state. Thus, the fuse time counter 73 functions as a holding circuit.

When a low-level output signal RST is outputted from the reset signal generating circuit 75 (the reset state) or a high-level output signal S2 (an example of a "clear signal") is outputted from the clear counter 72 (the clear counter 72 overflows), the fuse time counter 73 is reset to the initial value "0". In particular, the level-inverted signal of an output signal S2 from the clear counter 72 and an output signal S6 from the fuse time counter 73 are inputted in an OR circuit 81, an output signal from the OR circuit 81 and an output signal RST from the reset signal generating circuit 75 are inputted in an AND circuit 82, and the level-inverted signal of an output signal from the AND circuit 82 is inputted to the reset terminal of the fuse time counter 73. Thus, the fuse time counter 73 is reset to the initial value "0" while the low-level output signal RST is being outputted from the reset signal generating circuit 75.

On the other hand, while a high-level output signal RST is being outputted from the reset signal generating circuit 75, the fuse time counter 73 is reset to the initial value "0" by a high-level output signal S2 from the clear counter 72 until the fuse time counter 73 overflows. After the fuse time counter 73 overflows, the fuse time counter 73 is not reset and the second forced shutoff state is retained even if the high-level output signal S2 is outputted from the clear counter 72.

The fuse time counter 73 sequentially outputs signals, in particular, low-level bit signals "bit 0" to "bit 5", according to the amount of time (counter value) accumulated by count-up operation, as shown in FIG. 7. Accordingly, FETs 61a to 61f in the threshold voltage generator 52 are sequentially and selectively turned on. Thus, the level of the first anomaly threshold voltage Voc can be gradually decreased in accordance with the accumulated time.

d. Clear Counter

The main function of the clear counter 72 (an example of a "normal time accumulating circuit" and an "output circuit") is to clear the accumulated time (counter value) of the fuse time counter 73 back to the initial value "0" if a normal state (in which neither an abnormal current nor abnormal temperature occurs) has continued for a predetermined reference normal period of time (the time required for counting down from "0" to "q", specifically for 512 msec) during the period between the start of count-up by the fuse time counter 73 and its overflow. In particular, the clear counter 72 counts up from the initial value "0" to "q (<n)" in synchronization with the clock signal CLK2. The clear counter 72 performs the count-up at the leading edge of each clock. The reference normal time period (reference waiting time) may be determined on the basis of the time in which a fuse current or overcurrent is removed and overheat of the load is eliminated.

The clear counter 72 is reset to the initial value "0" when a low-level output signal RST is outputted from the reset signal generating circuit 75 (the reset state). In the period between the start of count-up by the fuse time counter 73 and its overflow, the clear counter 72 is reset when it receives a low-level second abnormal current signal FC from the current detector 24 or when the power MOSFET 14 is forcedly shut off by the shutoff time counter 71. Once the fuse time counter 73 overflows, the clear counter 72 is reset in response to a low-level control signal S1 (on signal).

In particular, the clock signal CLK2 is directly inputted from the oscillating circuit 74 to the clear counter 72 and the clear counter 72 normally outputs a low-level output signal S2. When the clear counter 72 counts up to "q" and overflows, the clear counter 72 outputs a high-level signal S2 (second off signal) equivalent to, for example, 1 clock. The output signal RST from the reset signal generating circuit 75 is inputted into an AND circuit 83, which then outputs the level-inverted signal of the output signal to the reset terminal of the clear counter 72. Thus, when the low-level output signal RST is outputted from the reset signal generating circuit 75, the counter is reset to the initial value "0".

Also inputted into the AND circuit 83 is an output signal from the AND circuit 84, to which an output signal from an OR circuit 85 and an output signal from a NAND circuit 86 are inputted. Inputted in the OR circuit 85 are an output signal from an AND circuit 87 and the output signal S6 from the fuse time counter 73. Inputted into the AND circuit 87 are the second abnormal current signal FC and the level-inverted signal of the output signal S5 from the shutoff time counter 71. With this configuration, the counter value of the clear counter 72 is reset when it receive a low-level second abnormal current signal FC or when the power MOSFET 14 is forced to shut off by the shutoff time counter 71, in a period from the start of count-up by the fuse time counter 73 to its overflow, as described above.

The output signal S6 from the fuse time counter 73 and the level-inverted signal of the control signal S1 are inputted in the NAND circuit 86. Thus, the clear counter 72 is reset when it receives the low-level control signal S1 (on signal) after the fuse time counter 73 overflows.

Gate Driver

Figure 8:
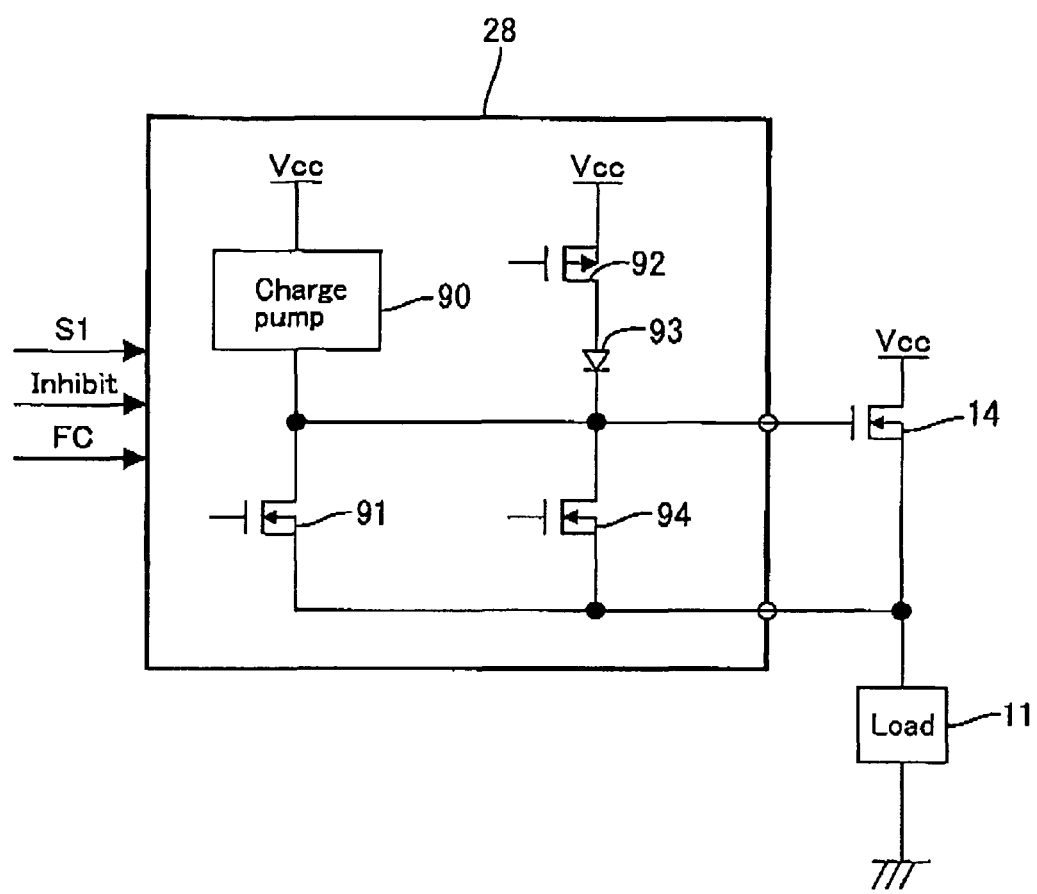
FIG. 8 is a schematic diagram showing a configuration of a gate driver.

FIG. 8 schematically shows a configuration of the gate driver 28. Inputted in the gate driver 28 are the control signal S1, second abnormal current signal FC, and output signal, Inhibit, from the control logic unit 27. The gate driver 28 includes a charge pump 90 connected between the power supply terminal P2 and the gates of the power MOSFET 14 and the sense MOSFET 18 (not shown in FIG. 8), and a normal discharge FET 91 connected between the gates and sources of the power MOSFET 14 and the sense MOSFET 18. The gate driver 28 further includes a FET 92 for quick charge used when an anomaly occurs and a diode 93 which are connected between the power supply terminal P2 and the gate of the power MOSFET 14 and the sense MOSFET 18, a FET 94 for quick discharge used when an anomaly occurs and connected between the gate and source of the power MOSFET 14 and the sense MOSFET 18.

Figure 9:
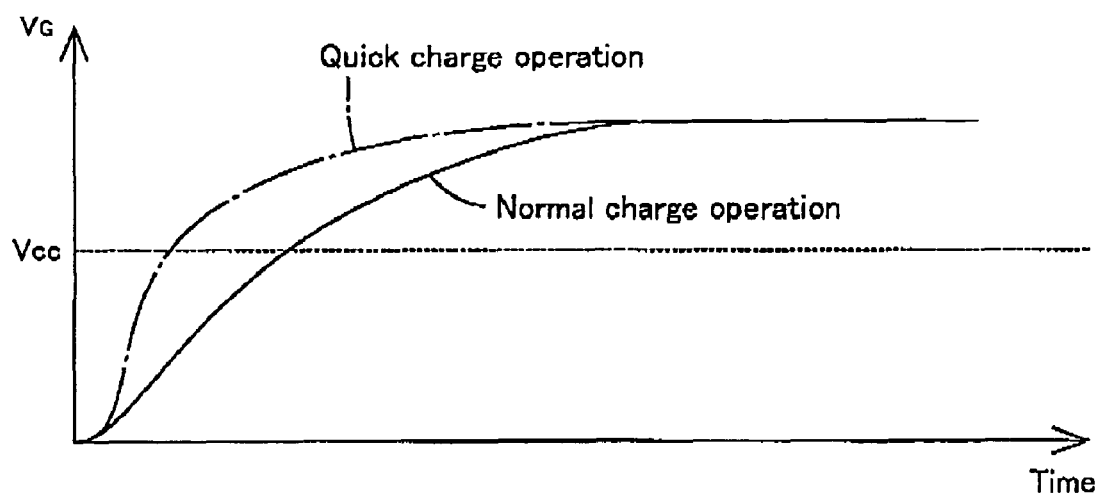
FIG. 9 shows a graph of gate voltage versus time during a charging period.
Figure 10:
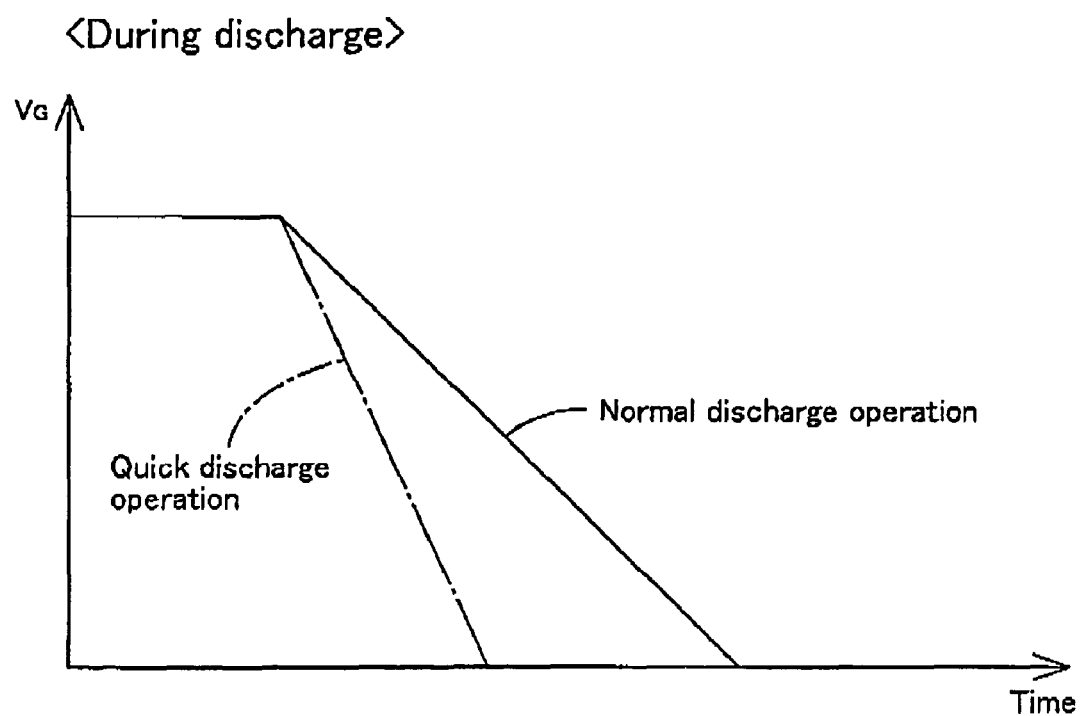
FIG. 10 shows a graph of gate voltage versus time during a discharging period.

Under normal conditions where neither abnormal current nor temperature has occurred, the gate driver 28 performs normal charge operation in which it receives the low-level control signal S1 (on signal), drives only the charge pump 90 to rise the power supply voltage Vcc to a higher level and provides the risen voltage to the gate-source of each of the power MOSFET 14 and the sense MOSFET 18 to turn on the power MOSFET 14 and the sense MOSFET 18, thereby brining them into conduction (see the graph "During charge" in FIG. 9). On the other hand, in response to a high-level control signal S1 (off signal), the gate driver 28 performs normal discharge operation in which it turns off the voltage rising operation of the charge pump 90 and turns on the normal discharge FET 91 alone to discharge the charge on the gate-source of each of the power MOSFET 14 and the sense MOSFET 18 to shut off (see the graph "During discharge" in FIG. 10).

If the gate driver 28 receives the low-level control signal S1 (on signal) while receiving a low-level second abnormal current signal FC, the gate driver 28 performs a quick charge operation in which it turns on the quick charge FET 92 as well as the charge pump 90, to increase the speed of voltage rise to the level of the power supply voltage Vcc (see the graph "During charge" in FIG. 9). If the gate driver 28 receives the high-level control signal S1 (off signal) while receiving the low-level second abnormal current signal FC, the gate driver 28 performs a quick discharge operation in which it turns on the quick discharge FET 94 as well as the normal discharge FET 91 to quickly discharge the charge on the gate-source of each of the power MOSFET 14 and the sense MOSFET 18 (See the graph "During discharge" in FIG. 10).

The gate driver 28 also performs the quick discharge operation in response to a low-level output signal, Inhibit, (when the first or second forced shutoff occurs).

EFFECTS OF THE EMBODIMENTS

FIG. 11 is a timing chart of a control signal S1 which is a low-level constant voltage signal received by a power supply controller 10. First, in response to the low-level control signal S1, an internal ground GND2 is generated at the internal ground generator 23. After the internal ground GND2 becomes stable, a high-level output signal RST is outputted from the reset signal generating circuit 75 and the counters 71 to 73 are brought out of the reset state.

The low-level control signal S1 is provided to the gate driver 28 to turn on the power MOSFET 14 to bring it in conduction. At this point in time, an inrush current which is higher than the second anomaly threshold current ILfc flows through the power MOSFET 14. However, the initial level of the first anomaly threshold current ILoc is higher than the inrush current and the inrush current therefore prevents the power MOSFET 14 from performing the first forced shut off.

The inrush current causes the fuse time counter 73 to start counting up. The counter values are accumulated and the level of the first anomaly threshold current ILoc is decreased with the accumulated time until the level of the load current IL decreases below that of the second anomaly threshold current ILfc. When the load current IL decreases below the second anomaly threshold current ILfc and a normal condition is reached (see "Normal condition 1" in FIG. 11), the clear counter 72 start counting up. However, the normal condition does not continue for the reference normal period and the count value of the clear counter 72 is reset at the time the level of the load current IL exceeds that of the second normal threshold current ILfc (see "Abnormal current 1" in FIG. 11). Therefore, the count value of the fuse time counter 73 is not cleared by the high-level output signal S2.

On the other hand, if the normal condition continues for the reference normal time period (see. "Normal condition 2" in FIG. 11), the clear counter 72 overflows, the high-level output signal S2 is outputted, and the count value of the fuse time counter 73 is reset. Consequently, the first anomaly threshold current ILoc returns to the initial level. If for example another switching element is provided downstream (on the load 11 side) from the power MOSFET 14 and the switching element is turned on and off multiple times at given time intervals (each interval is longer than the reference normal time period) while the power MOSFET 14 is in the on state, multiple inrush currents can occur. In that case, the first anomaly threshold current ILoc can be returned to the initial level each time an inrush current occurs to prevent the inrush current from forcing the power MOSFET 14 to perform the first forced shutoff.

If an abnormal current occurs due to a short-circuit, for example, of the load 11, the fuse time counter 73 restarts counting up at the time the level of the load current IL exceeds that of the second anomaly threshold current ILfc. As a result, the level of the first anomaly threshold current ILoc decreases again with time. When the load current IL affected by the anomaly exceeds that of the first anomaly threshold current ILoc, the first forced shutoff of the power MOSFET 14 is performed. When the shutoff time counter 71 overflows (after the reference shutoff time elapsed), the power MOSFET 14 returns to conduction. As long as the abnormal current state persists, the first forced shutoff and return to conduction is repeated (see "OC chopping period" in FIG. 11). The fuse time counter 73 is counting up during all that time and consequently the level of the first anomaly threshold current ILoc decreases to a low level near that of the second anomaly threshold current ILfc. Thus, the overcurrent state can be detected by the low first anomaly threshold current ILoc.

Shortly after that, a fuse current state in which the load current IL exceeds at least the second anomaly threshold current ILfc (see "Abnormal current 2" in FIG. 11) occurs and continues for a time until the fuse time counter 73 overflows. Then the power MOSFET 14 is caused to perform the second forced shutoff.

The second anomaly threshold current ILfc is set to a level slightly higher than that of the rated current ILmax of the load 11. The reference fuse time is set to a time shorter than the time period between detection of a fuse current that exceeds the second anomaly threshold current ILfc and intermittently occurs at short time intervals shorter than the reference normal time period and the time at which the wire 30 gives off smoke. Therefore, a chattering short in which a twisted pair among the twisted pairs of the wire 30 is short-circuited and an abnormal current flows through only that twisted pair fox a time shorter than the reference normal time period can be detected and the power MOSFET 14 can be caused to perform the second shutoff before the wire 30 can give off smoke.

In the second forced shutoff state, the counter value of the clear counter 72 is reset and is outputting the low-level output signal S2 while it is receiving the low-level control signal S1. Therefore, the fuse time counter 73 is not cleared as long as the low-level control signal S1 is being inputted (see "Latch state" in FIG. 11). Then, when the power supply controller 10 receives the high-level control signal S1 (off signal), the clear counter 72 starts counting up.

FET 41 of the internal ground generator 23 is turned off in response to the high-level control signal S1. However, the FET 42 has been turned on by receiving low-level output signal S2 and the conduction state is retained. Therefore, even if a driver of the vehicle performs an operation that inputs the high-level control signal S1 (off signal) after the second forced shutoff and, immediately after that, inputs the low-level control signal S1 (on signal), the second forced shutoff state can be retained as long as the time interval is within the reference normal time period.

If the high-level control signal S1 (off signal) is continuously inputted to the input terminal P1 for the reference normal time period, the clear counter 72 overflows and provides the high-level output signal S2 to the internal ground generator 23 to bring it out of conduction. Accordingly, a leakage current can be prevented from flowing from the power source 12 to the ground through the internal ground generator 23 to reduce the charging capacity of the power source 12 (on-vehicle battery). Here, a low-level output signal RST is outputted from the reset signal generating circuit 75 to reset the count values of the counters 71 to 73. When the low-level output signal RST is outputted, a FET 101 is turned off in response to the low-level output signal RST to activate a high-level holding circuit 100, which then holds the output signal S2 at a high-level. Therefore generation of the internal ground GND2 by the internal ground generator 23 is shut off even though the counter value of the clear counter 72 is reset.

Figure 12:
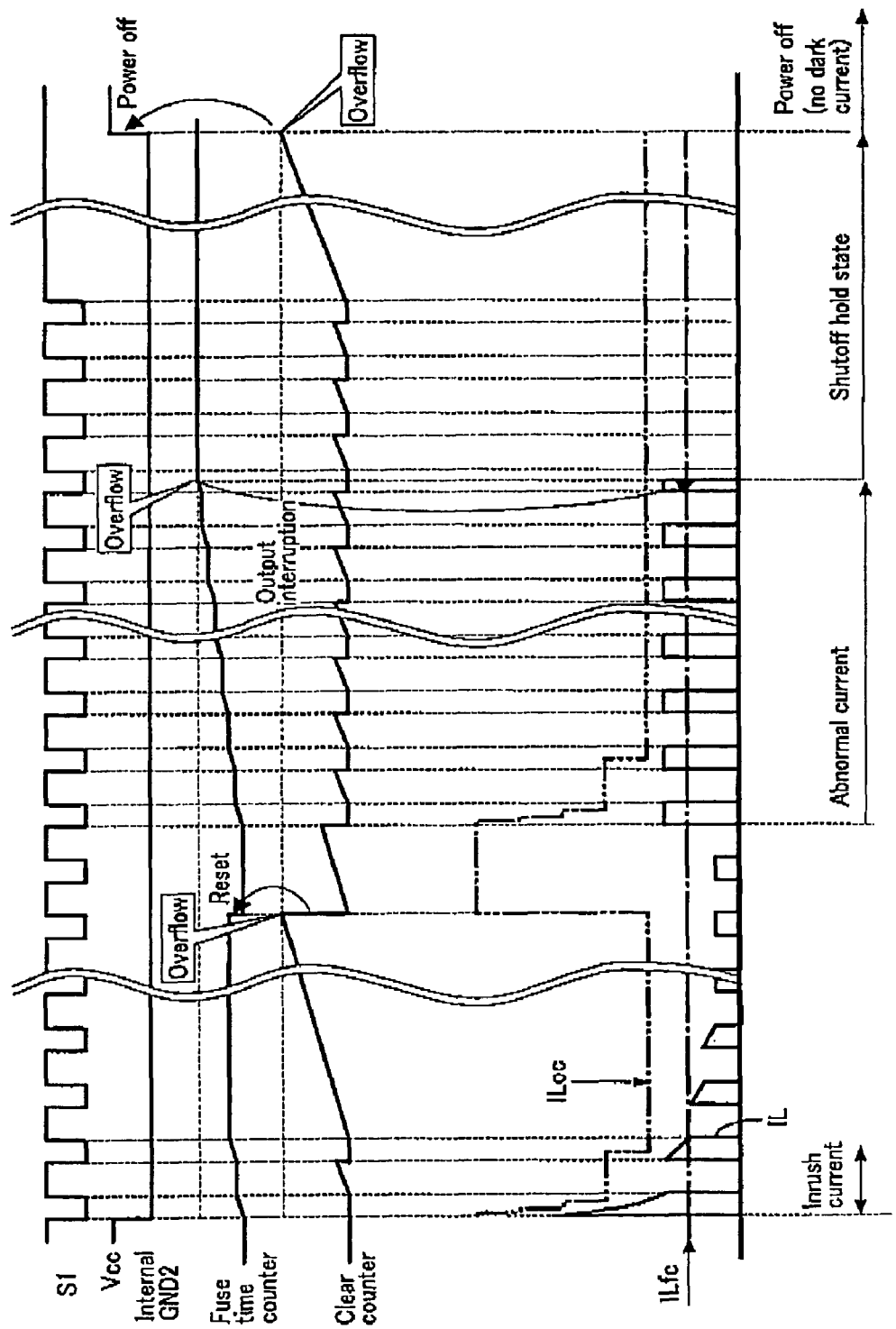
FIG. 12 is a timing chart of a control signal which is a PWM signal received by a power supply controller.

FIG. 12 is a timing chart of a control signal S1 which is a PWM signal periodically varying between a high level and low level received by the power supply controller 10. The reference normal time period described above is set to a time longer than the off time period (the time period during which the high level is maintained) of the PWM signal. This prevents the clear counter 72 from overflowing to output the high-level output signal S2 during each off time period in which the high-level control signal S1 is being inputted while the control signal S1, which is the PWM signal, is being inputted to the input terminal P1. Accordingly, the internal ground generator 23 can be prevented from being brought out of conduction while the PWM signal is being inputted. Also, the fuse time counter 73 can be prevented from being cleared to cause the first anomaly threshold current ILoc to return to its initial level by the high-level PWM signal which would otherwise be inputted after an anomaly occurs. Thus, an overcurrent can be detected with a low-level first anomaly threshold current ILoc.

Other Illustrative Aspects

The present invention is not limited to the embodiments described above and shown in the drawings. For example, the following embodiments are also included in the technical scope of the present invention.

(1) While a power MOSFET 14 is used as the switching element in the illustrative aspects described above, the present invention is not so limited. Any of other unipolar or bipolar transistors may be used.

(2) While a level sense method is used that uses a sense MOSFET 18 as a current detecting element in the illustrative aspects, a shunt method may be used in which a shunt resistance is provided in a conduction channel and a load current is detected on the basis of the amount of voltage drop at the shunt resistance.

(3) While an abnormal signal is outputted based on an abnormal current and an abnormal temperature, resulting in the power to MOSFET 14 (as anomaly detecting circuit) caused to shut off on the basis of the abnormal signal, the present invention is not so limited. The power MOSFET 14 may be forced to shut off on the basis of one of an abnormal current and abnormal temperature. Furthermore, the power MOSFET 14 may be shut off in response to other anomaly. For example, a switching element may be shut off if an anomaly is detected in which for example a person is stuck in an electric sliding door of the vehicle when the door is opened or closed. In such a case, the switching element can be prevented from being brought out of the shut off state to temporarily restart the close operation when on and off signals are inputted repeatedly in a short time by the driver.

(4) While the power MOSFET 14 is forced to be kept shut off if a reference anomaly time has elapsed after detection of anomaly, the present invention is not limited. The power MOSFET 14 may be shut off at the time an anomaly is detected.

(5) While the clear counter 72 in the illustrative aspects functions as an off instruction output circuit and a normal time accumulating circuit of the present invention, the present invention is not so limited. The off instruction circuit and the normal time accumulating circuit may be separated from each other. Furthermore, the time period after which the clear counter 72 overflows before the power MOSFET 14 is forced to shut off may differ from the time period after which the clear counter 72 overflows after the forced shutoff of the power MOSFET 14. That is, the "reference normal time period" and the "reference waiting time period" as used herein may differ from each other.

What is claimed is:

1. A power supply controller comprising:
   a switching element electrically connected between a power source and a load;
   an anomaly detecting circuit capable of outputting an abnormal signal;
   a power supply circuit which generates a constant voltage;
   a holding circuit which is activated by being supplied with the constant voltage generated by the power supply circuit, continuously outputs a shutoff signal to cause the switching element to perform a shutoff operation on the basis of the abnormal signal;
   an output circuit, wherein if a first off signal is being inputted from an external source, the first off signal continues for a predetermined period of time after the start of the continuous output of the shutoff signal, and the output circuit outputs a second off signal; and
   an electrical conduction circuit structured to enable the power supply circuit into conduction in response to an on signal from the external source and enable the power supply circuit out of conduction if both the first off signal and the second off signal are detected.

2. The power supply controller according to claim 1, wherein the anomaly detecting circuit comprises:
   a current detecting element which detects a load current flowing through the switching element; and
   an abnormal current detecting circuit that is connected to the current detecting element and that outputs an abnormal current signal as the abnormal signal if the load current flowing through the switching element exceeds a predetermined threshold.

3. The power supply controller according to claim 2, wherein the switching element is a power field effect transistor and the current detecting element is a sense field effect transistor through which a sense current flows based from the load current flowing through the power field effect transistor; and
   the abnormal current detecting circuit outputs the abnormal current signal if the sense current exceeds a value of the predetermined threshold.

4. The power supply controller according to claim 1, wherein the anomaly detecting circuit comprises:
   a temperature detecting element which detects the temperature of the switching element; and
   an abnormal temperature detecting circuit which outputs, on the basis of a detection signal from the temperature detecting element, an abnormal temperature signal as the abnormal signal if the temperature of the switching element exceeds a predetermined threshold.

5. The power supply controller according to claim 2, wherein the anomaly detecting circuit comprises:
   a temperature detecting circuit which detects the temperature of the switching element; and
   an abnormal temperature detecting circuit which outputs, on the basis of a detection signal from the temperature detecting element, an abnormal temperature signal as the abnormal signal if the temperature of the switching element exceeds a predetermined threshold.

6. The power supply controller according to claim 1, comprising a normal time accumulating circuit which outputs a clear signal if the abnormal signal is not outputted and continues for a predetermined period of time before the output state is held,
   wherein the electrical conduction circuit enables the power supply circuit out of conduction if the first off signal is inputted and the clear signal is outputted, before the output state is held.

7. The power supply controller according to claim 6, wherein the holding circuit comprises an anomaly time accumulating circuit which measures the amount of anomaly time during which the abnormal signal is being outputted and, if the measured amount of time reaches a predetermined anomaly time, outputs the shutoff signal and holds the output state.

8. The power supply controller according to claim 7, wherein the anomaly time accumulating circuit clears the measured amount of anomaly time if the clear signal is outputted from the normal time accumulating circuit before the output state is held.

9. The power supply controller according to claim 6, wherein the normal time accumulating circuit functions as the output circuit as the amount of normal time is initialized while the on signal is being inputted after the start of the continuous output of the shutoff signal and the normal time accumulating circuit starts accumulating if the first off signal is inputted and the normal time accumulating circuit outputs the clear signal as the second off signal if the amount of normal time reaches the reference normal time.

10. The power supply controller according to claim 7, wherein the normal time accumulating circuit functions as the output circuit as the amount of normal time is initialized while the on signal is being inputted after the start of the continuous output of the shutoff signal and the normal time accumulating circuit starts accumulating if the first off signal is inputted and the normal time accumulating circuit outputs the clear signal as the second off signal if the amount of normal time reaches the reference normal time.

11. The power supply controller according to claim 8, wherein the normal time accumulating circuit functions as the output circuit as the amount of normal time is initialized while the on signal is being inputted after the start of the continuous output of the shutoff signal and the normal time accumulating circuit starts accumulating if the first off signal is inputted and the normal time accumulating circuit outputs the clear signal as the second off signal if the amount of normal time reaches the reference normal time.

12. The power supply controller according to claim 6, further comprising a control circuit into which the on signal and the first off signal are alternately and repeatedly inputted and, when the on signal is inputted, enables the switching element to perform a conduction operation and, when the first off signal is inputted, enables the switching element to perform a shutoff operation,
   wherein the reference normal time is longer than a shutoff time period during which the switching element remains shut off by each input of the off signal.

13. The power supply controller according to claim 9, further comprising a control circuit into which the on signal and the first off signal are alternately and repeatedly inputted and, when the on signal is inputted, enables the switching element to perform a conduction operation and, when the first off signal is inputted, enables the switching element to perform a shutoff operation,
   wherein the reference normal time is longer than a shutoff time period during which the switching element remains shut off by each input of the off signal.

14. The power supply controller according to claim 10, further comprising a control circuit into which the on signal and the first off signal are alternately and repeatedly inputted and, when the on signal is inputted, enables the switching element to perform a conduction operation and, when the first off signal is inputted, enables the switching element to perform a shutoff operation, wherein the reference normal time is longer than a shutoff time period during which the switching element remains shut off by each input of the off signal.

15. The power supply controller according to the claim 11, further comprising a control circuit into which the on signal and the first off signal are alternately and repeatedly inputted and, when the on signal is inputted, enables the switching element to perform a conduction operation and, when the first off signal is inputted, enables the switching element to perform a shutoff operation, wherein the reference normal time is longer than a shutoff time period during which the switching element remains shut off by each input of the off signal.

* * * * *

UNITED STATES PATENT AND TRADEMARK OFFICE
CERTIFICATE OF CORRECTION

PATENT NO. : 7,848,071 B2
APPLICATION NO. : 11/643969
DATED : December 7, 2010
INVENTOR(S) : Seiji Takahashi et al.

Page 1 of 1

It is certified that error appears in the above-identified patent and that said Letters Patent is hereby corrected as shown below:

On the Title Page
Please delete

Item (73) Assignees: "Autonetworks Technologies, Ltd., Mie (JP); Sumitomo Wiring Systems, Ltd., Mie (JP); Sumitomo Electric Systems, Ltd., Osaka (JP)"

Please add

Item (73) Assignees: Autonetworks Technologies, Ltd., Mie (JP); Sumitomo Wiring Systems, Ltd., Mie (JP); Sumitomo Electric Industries, Ltd., Osaka (JP)

Signed and Sealed this
First Day of March, 2011

David J. Kappos
*Director of the United States Patent and Trademark Office*